US010565291B2

(12) United States Patent
Sbodio et al.

(10) Patent No.: US 10,565,291 B2
(45) Date of Patent: Feb. 18, 2020

(54) AUTOMATIC GENERATION OF PERSONALIZED VISUALLY ISOLATED TEXT

(71) Applicant: International Business Machines Corporation, Armonk, NY (US)

(72) Inventors: Marco Luca Sbodio, Castaheany (IE); Spyros Kotoulas, Dublin (IE); Vanessa Lopez Garcia, Dublin (IE); Natalia Mulligan, Dublin (IE); Pierpaolo Tommasi, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 15/790,202

(22) Filed: Oct. 23, 2017

(65) Prior Publication Data

US 2019/0121841 A1  Apr. 25, 2019

(51) Int. Cl.
| | | |
|---|---|---|
| *G06F 17/22* | (2006.01) | |
| *G06F 17/27* | (2006.01) | |
| *G06F 17/24* | (2006.01) | |
| *G06F 16/335* | (2019.01) | |
| *G06F 16/35* | (2019.01) | |

(52) U.S. Cl.
CPC ........ *G06F 17/2229* (2013.01); *G06F 16/335* (2019.01); *G06F 16/358* (2019.01); *G06F 17/241* (2013.01); *G06F 17/2705* (2013.01); *G06F 17/2765* (2013.01); *G06F 17/2785* (2013.01)

(58) Field of Classification Search
None
See application file for complete search history.

(56) References Cited

U.S. PATENT DOCUMENTS

| | | | | |
|---|---|---|---|---|
| 8,706,685 | B1* | 4/2014 | Smith | ................ G06F 16/9558 707/608 |
| 9,633,048 | B1* | 4/2017 | Dutta | .................... G06F 17/271 |
| 2007/0124672 | A1 | 5/2007 | Cragun et al. | |
| 2008/0091408 | A1* | 4/2008 | Roulland | ............ G06F 16/3338 704/9 |
| 2008/0243777 | A1* | 10/2008 | Stewart | ................... G06F 16/36 |
| 2010/0131498 | A1* | 5/2010 | Linthicum | ............ G06F 16/338 707/722 |
| 2010/0313113 | A1* | 12/2010 | Chen | .................... G06T 19/006 715/230 |
| 2011/0161070 | A1 | 6/2011 | Chen et al. | |

(Continued)

OTHER PUBLICATIONS

Baralis et al., "Highlighter: automatic highlighting of electronic learning documents" Journal of Latex Class Files, vol. 13, No. 9, Sep. 2014, 12 pages, DOI 10.1109/TETC.2017.2681655.
Oellrich et al., "Generation of Silver Standard Concept Annotations from Biomedical Texts with Special Relevance to Phenotypes", Plos One | DOI:10.1371/journal.pone.0116040 Jan. 21, 2015, 17 pages. http://journals.plos.org/plosone/article?id=10.1371/journal.pone.0116040.

(Continued)

*Primary Examiner* — Howard Cortes
(74) *Attorney, Agent, or Firm* — Grant M. McNeilly

(57) ABSTRACT

Input text containing a plurality of patient information can be annotated for annotations and extracted. One or more annotations are parsed for relevant contextual information. The one or more annotations are assigned a semantic type. The one or more annotations are visually isolated, personalized to a user profile job, and outputted. The one or more extracted annotations are subjected to natural language processing operations.

13 Claims, 7 Drawing Sheets

(56) References Cited

U.S. PATENT DOCUMENTS

| | | | | |
|---|---|---|---|---|
| 2012/0030553 | A1* | 2/2012 | Delpha | G06F 16/435 715/205 |
| 2012/0110430 | A1* | 5/2012 | Park | G16B 45/00 715/230 |
| 2014/0072171 | A1* | 3/2014 | Tu | G06K 9/00671 382/103 |
| 2014/0337306 | A1* | 11/2014 | Gramatica | G06F 17/2785 707/706 |
| 2014/0337436 | A1* | 11/2014 | Hoagland | H04L 51/16 709/204 |
| 2015/0058417 | A1* | 2/2015 | McConnell | H04L 67/306 709/204 |
| 2015/0156236 | A1* | 6/2015 | McCall | H04L 65/60 709/204 |
| 2016/0277349 | A1* | 9/2016 | Bhatt | G06F 16/9535 |
| 2016/0350277 | A1* | 12/2016 | Malle | G06F 17/2785 |
| 2016/0350280 | A1* | 12/2016 | Lavallee | G06F 17/277 |
| 2017/0103560 | A1 | 4/2017 | Kraft et al. | |
| 2017/0147635 | A1* | 5/2017 | McAteer | G06F 16/9024 |
| 2017/0286103 | A1* | 10/2017 | Caritos, II | G06F 11/3604 |
| 2018/0018320 | A1* | 1/2018 | Boyer | G06F 17/278 |
| 2018/0357210 | A1* | 12/2018 | Mankovich | G06F 19/324 |
| 2018/0365229 | A1* | 12/2018 | Buhrmann | G06Q 50/00 |

OTHER PUBLICATIONS

Swine et al., "Relevant learning objects extraction based on semantic annotation", Int. J. Metadata, Semantics and Ontologies, vol. 8, No. 1, 2013, Copyright © 2013 Inderscience Enterprises Ltd., 15 pages https://pdfs.semanticscholar.org/0cb0/ea32a6c41e07de01c1444760b767a558f17b.pdf.

Lin et al., "Summarizing While Recording: Context-Based Highlight Detection for Egocentric Videos", 2015 IEEE International Conference on Computer Vision Workshops, 9 pages, Dec. 2015. www.umiacs.umd.edu/~morariu/publications/LinEgocentricICCVW15.pdf.

Wu et al., "Automatic Generation of Personalized Annotation Tags for Twitter Users", Human Language Technologies: The 2010 Annual Conference of the North American Chapter of the ACL, Los Angeles, California, Jun. 2010, Copyright 2010 Association for Computational Linguistics, 4 pages. http://www.aclweb.org/anthology/N10-1101.

Li et al., Personalized text snippet extraction using statistical language models, Pattern Recognition, vol. 43, Issue 1, Jan. 2010, 9 pages.

"AlchemyLanguage", IBM Watson Developer Cloud, printed Oct. 23, 2017, 3 pages, © 2017 IBM. https://www.ibm.com/watson/developercloud/alchemy-language.html.

* cited by examiner

200A

-Patient states he is doing ok with diabetes management. He is checking his BS 3x/day (BS is 95-130 in AM and PM) and he takes 80mg of Metformin once/day. He is running 3x/week for 1 hour at a time. He admits to needing help with meal planning. Pt has been diabetic for 20 years. Care manager offered to send Pt for diabetic education-

-<u>Patient</u> states he is doing ok with <u>diabetes management</u>. He is checking his <u>BS</u> 3x/day (<u>BS</u> is 95-130 in AM and PM) and he takes 80mg of <u>Metformin</u> once/day. He is <u>running</u> 3x/week for 1 hour at a time. He admits to needing help with <u>meal planning</u>. Pt has been <u>diabetic</u> for 20 years. Care manager offered to send Pt for <u>diabetic education-</u>

FIG. 2B

200C i.e. [SEMANTIC TYPE (*insert semantic identifier*): *social and medical annotation*]

-[PERSON (*contact*):*Patient*] states he is doing ok with [SERVICE (*social*):*diabetes management*]. He is checking his [LABS(*clinical*):*BS*] 3x/day ([LABS(*clinical*):*BS*] is 95-130 in AM and PM) and he takes 80mg of [MEDICATION(*clinical*): *Metformin*] once/day. He is [PROCEDURE(*clinical*): *running*] 3x/week for 1 hour at a time. He admits to needing help with [ACTIVITY(*social*): *meal planning*]. Pt has been [DISEASE(*clinical*): *diabetic*] for 20 years. Care manager offered to send Pt for [SERVICE (*social*): *diabetic education*]-

-[PERSON (*contact*):*Patient*] states he is doing ok with [SERVICE (*social*):*diabetes management*]. He is checking his [LABS(*clinical*):*BS*] 3x/day ([LABS(*clinical*):*BS* is 95-130 in AM and PM*) and he takes *80mg of* [MEDICATION(*clinical*): *Metformin*] once/day. He is [PROCEDURE(*clinical*): *running*] 3x/week for 1 hour at a time. He admits to needing help with [ACTIVITY(*social*): *meal planning*]. Pt has been [DISEASE(*clinical*): *diabetic*] for 20 years. Care manager offered to send Pt for [SERVICE (*social*): *diabetic education*]-

-[PERSON (contact):*Patient*] states he is *doing ok with* [SERVICE (social):*diabetes management*]. He is checking his [LABS(clinical):BS] 3x/day ([LABS(clinical):*BS is 95-130*] in AM and PM) and he takes 80mg of [MEDICATION(clinical):*Metformin*] once/day. He is [PROCEDURE(clinical): *running 3x/week for 1 hour*] at a time. He admits to needing help with [ACTIVITY(social):*meal planning*]. Pt has been [DISEASE(clinical):*diabetic for 20 years*]. Care manager offered to send Pt for [SERVICE (social):*diabetic education*].

Medication Measure: 80mg of Metformin once/day
Lab Information: BS 3x/day; BS 95-130 in AM and PM
Clinical Disease: Diabetes
Clinical Procedure: Running
Social Service: Diabetic management; Diabetic education

Contact: Patient
Medication: Metformin
Clinical disease/duration: Diabetic for 20 years
Well-being; Doing ok with Diabetes management
Clinical Procedure: Running 3x /week for 1 hour
Activities of Daily Living: Meal planning
Social Service: Diabetic education

FIG. 2G

AUTOMATIC GENERATION OF PERSONALIZED VISUALLY ISOLATED TEXT

BACKGROUND

The present disclosure relates to natural language processing and knowledge extraction, and more specifically, to highlighting text in a document.

SUMMARY

Aspects of the present disclosure are directed to a method for automatically generating visually isolated text fragments from a text document, personalized to a user profile. The method can comprise receiving input text. The method can further comprise annotating the input text by annotating respective text fragments of the input text for respective concepts of a set of concepts. Annotating the input text can further comprise categorizing respective annotated text fragments of the input text for categories of a set of categories. The method can further comprise retrieving profile characteristics of the user profile. The method can further comprise visually isolating respective text fragments of the input text based on the characteristics of the user profile. The method can further comprise outputting the visually isolated text to a user device associated with the user profile.

Aspects of the present disclosure are further directed to a system comprising a computer readable storage medium storing a corpus of data, a user interface configured to receive input and present output, and a processor communicatively couple to the computer readable storage medium and the user interface and a memory comprising instructions. The processor can be configured to receive input text. The processor can be configured to annotate the input text by annotating respective text fragments of the input for respective concepts of a set of concepts and categorizing respective annotated text fragments of the input text for categories of a set of categories. The processor can be further configured to retrieve profile characteristics of the user profile. The processor can be further configured to visually isolate respective text fragments of the input text based on the characteristics of the user profile. The processor can be further configured to output the visually isolated text to the user interface.

Aspects of the present disclosure are further directed to a computer program product comprising a computer readable storage medium having program instructions executable by a processor. The program instructions can cause the processor to receive input text. The program instructions can further cause the processor to annotate the input text by annotating respective text fragments of the input for respective concepts of a set of concepts. Annotating the input text can further comprise categorizing respective annotated text fragments of the input text for categories of a set of categories. The program instructions can further cause the processor to retrieve profile characteristics of the user profile. The program instructions can further cause the processor to visually isolate respective text fragments of the input text based on the characteristics of the user profile. The program instructions can further cause the processor to output the visually isolated text to a user device associated with the user profile.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

FIG. 2A illustrates an example input text in accordance with some embodiments of the present disclosure.

FIG. 2B illustrates an example of annotated input text in accordance with some embodiments of the present disclosure.

FIG. 2C illustrates an example of semantically classified input text in accordance with some embodiments of the present disclosure.

FIG. 2D illustrates an example output text in accordance with some embodiments of the present disclosure.

FIG. 2E illustrates a second example output text in accordance with some embodiments of the present disclosure.

FIG. 2F illustrates a third example output text in accordance with some embodiments of the present disclosure.

FIG. 2G illustrates a fourth example output text in accordance with some embodiments of the present disclosure.

Figure 1:
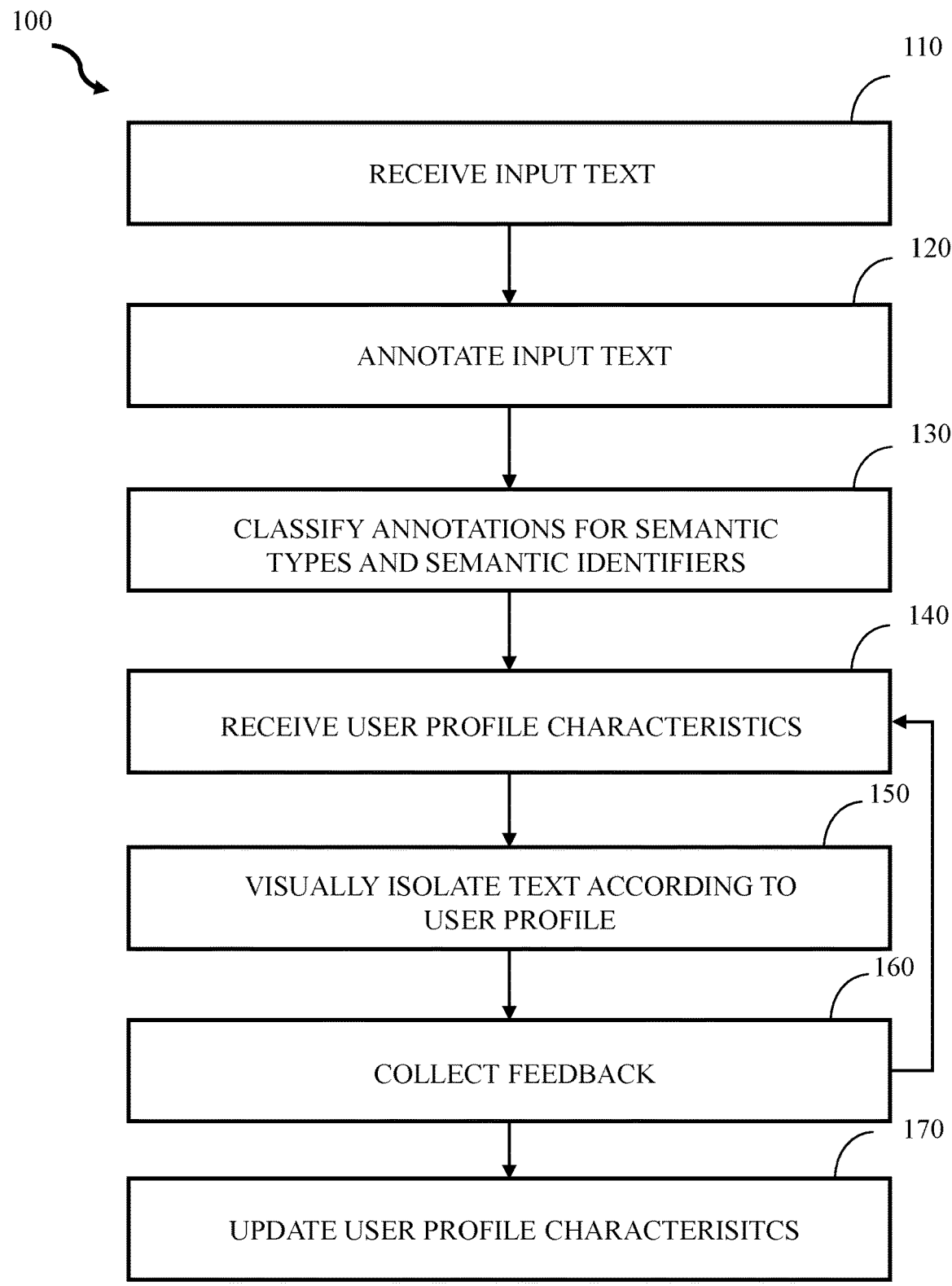
FIG. 1 illustrates a flowchart of an example method for generating personalized visually isolated text in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

Aspects of the present disclosure relate to natural language processing (NLP) and knowledge extraction. More particular aspects relate to automatically generating personalized visually isolated text. Personalized visually isolated text can provide a summative representation of a plurality of information. The summative representation can be specialized to characteristics (e.g., preferences) of a user profile. Although not limited to such applications, an understanding of some embodiments of the present disclosure may be improved given the context of NLP.

Aspects of the present disclosure relate to NLP and knowledge extraction systems for medical information (e.g., patient case notes, medical history, etc.). Some embodiments of the present disclosure can be configured to extract, for example, entities (e.g., a disease entity, a medical entity, etc.), their semantic type (e.g., a disease such as being diabetic, a medical type such as a medication, etc.), and their semantic relationship (e.g., a concept, a measurement, etc.). This extraction may be based on a user profile (e.g., based on information preferences of a user such as, for example, a doctor, a nurse, or a different health-care practitioner). In some embodiments, the system automatically extracts and generates visually isolated text most relevant for the user profile. Generating visually isolated text can mean to take a non-isolated fragment and isolate it. For example, in embodiments, when a user profile is not concerned with temporal information, the phrase "Pt has been diabetic for 20 years" can be displayed as "DISEASE: diabetic" to a user device. In some embodiments, the phrase is not modified but a relevant term (e.g., "diabetic") is highlighted on a user device associated with the user profile.

Some embodiments of the present disclosure relate to machine-learning annotators. Machine-learning annotators identify and extract social and medical annotations. In embodiments, an example of a machine learning annotator is WATSON NATURAL LANGUAGE UNDERSTANDING (NLU). Although not limited to such annotator, an understanding of some embodiments of the present disclosure may be improved given the context of the annotator.

Advantageously, the present disclosure improves the accuracy and efficiency of cognitive roadmaps for care-management systems (e.g. Watson Care Manager). Existing care management systems summarize pieces of text, marking the main points in the document for a universal user. The proposed improvement combines semantic and linguistic inferences, executed through a processing unit, on top of the ground truth text manually annotated by users to enable the method to predict the correct textual context to highlight. In doing so, the method prioritizes relevant annotations based on previous user history. Further, the present disclosure extends beyond domains of health care, to systems in which information is extracted from text and presented in a more concise way (e.g. Enterprise Content Management, Curam Social Program Management, etc.). The aforementioned advantages are example advantages and embodiments of the present disclosure exist that can contain all, some, or none of the aforementioned advantages while remaining within the spirit and scope of the present disclosure.

Referring now to the figures, FIG. 1 depicts a flowchart of an example method for generating personalized visually isolated text in accordance with some embodiments of the present disclosure. In various embodiments, the method 100 can be implemented by one or more processors. In embodiments, the method 100 starts with operation 110. Operation 110 can receive input text (e.g. case notes for a patient) from, for example, a graphical user interface, a database, a network, or a different source. In various embodiments, the input text can comprise medical information for a patient (e.g., a history of patient clinical information). In embodiments, the input text is can be created by a user (e.g., doctor, care manager, patient etc.).

FIG. 2A illustrates example input text 200A in accordance with some embodiments of the present disclosure. Example input text 200A shows example medical information for an example patient. Example input text 200A can be created by, for example, a health practitioner (e.g., a nurse) and presented to another health practitioner (e.g., a doctor). In some embodiments, example input text 200A can be retrieved from a database. Although example input text 200A illustrates a small amount of text, in some embodiments, text received in operation 110 of FIG. 1 can include a significantly larger amount of text. Although example input text 200A is associated with medical information, input text received in operation 110 of FIG. 1 can be associated with a variety of other types of information according to various embodiments of the present disclosure.

Referring again to FIG. 1, operation 120 can automatically extract annotations from the input text received in operation 110 using annotators. According to embodiments, operation 120 can annotate respective concepts (e.g., medicine, patient name, etc.) for respective text fragments of the input text. Operation 120 can also group into categories (e.g., contact, clinical etc.) respective annotated-concept text fragments. In various embodiments, social and medical annotations within the input text are extracted and linked to domain Knowledge Graphs (KGs) and ontologies.

FIG. 2B illustrates example annotated text 200B in accordance with some embodiments of the present disclosure. Underlined portions of annotated input text 200B are annotated concepts such as "patient," "diabetes management," and "BS".

Referring again to FIG. 1, the extracted concepts and categorized annotations of operation 120 are collected by operation 130. Operation 130 can be configured to identify and/or assign a semantic-type classification to the annotations linked to KGs and ontologies. Identification occurs through natural language processing of the annotated input text. For example, parse dependency trees are used to learn the context of the relevant annotations (e.g., measures for medications) generated by operation 120. In some embodiments, operation 130 identifies a semantic type and/or a semantic identification category for respective portions of input text annotated in operation 120 by filtering the respective portions of input text annotated in operation 120 through one or more parse dependency trees. In embodiments, the semantic types can include, but are not limited to: activity, disease, labs, medication, person, procedure, and service. In embodiments, the semantic identification categories can include, but are not limited to: contact, clinical, and social. In embodiments, the semantic categories are obtained by semantic inferences over the semantic types using the ontologies hierarchy or KGs. Thus, annotations in the annotated input text of operation 120 are assigned to (and/or linked to) semantic type classifications in operation 130. In some embodiments, operation 130 can obtain the semantic information (entity types) and the parse dependency tree for each sentence in operation 130 to map the contextual pattern of the input text. Operation 130 can use NLP and semantic techniques to learn the relevant context for annotations generated by existing text annotators.

For example, FIG. 2C illustrates example semantically classified text 200C in accordance with some embodiments of the present disclosure. Semantically classified text 200C classifies annotations of example annotated input text 200B. For example, "Metformin," in annotated input text 200B is given a classifier, "Medication(clinical)," in semantically classified text 200C.

Referring again to FIG. 1, operation 130 can forward the semantically classified input text to operation 140. In various embodiments, operation 140 can incorporate previous feedback from user profiles similar to profiles of a current user and infer the correct (textual) context to visually isolate relevant portions of input text for a user profile. For example, a previous doctor may provide feedback that identifiers were incorrectly assigned for a patient's information which indicated a diabetic history and use of Pioglitazone. While the machine learning annotator may correctly identify semantics for diabetic history, it may incorrectly identify Pioglitazone as a disease/clinical semantic relation. Corrected through user feedback (indicating that Pioglitazone is a medication rather than disease), the system can learn medication for a patient associated with a diabetic history. Because Pioglitazone is often an alternative to Metformin, in future trials, the system may be able to correctly identify Metformin as a medication/clinical semantic relationship for a doctor user profile.

Operation 150 can use information derived in operation 140 and visually isolate the n-personalized text fragments for a user profile. The n-personalized text fragments can be output to the user interface. In some embodiments, the n-personalized text fragments can be visually isolated by presenting the n-personalized text fragments without the other input text. In some embodiments, the n-personalized text fragments can be visually isolated by highlighting the n-personalized text fragments and not highlighting the other portions of the input text. The n-personalized text fragments can be automatically personalized to the user profile (user profile can be based on, for example, a job type, a role, a designation, etc.).

FIG. 2D illustrates example output text 200D in accordance with some embodiments of the present disclosure. For example, the example output text 200D can output the top-n personalized text fragments which can be visually isolated (e.g., automatically highlighted) for a user. In example output text 200D, the user profile characteristics (e.g., a user profile associated with a doctor, a nurse, an aide, a health professional, a care giver, etc.) demonstrate the user is interested in modifiers representing measures and temporal information for medications and labs. Further the user is interested in all clinical annotations and services.

FIG. 2E illustrates a second example output text 200E in accordance with some embodiments of the present disclosure. The second example output text 200E contains the top-n personalized text fragments automatically highlighted for a second user (e.g., a care manager). The method 100 can learn, based on profile characteristics (e.g., historical data) of the second user, that the second user is interested in lab measures, medication names, well-being associated to services and procedures, all clinical, social, and contact annotations and not temporal information. For example, "doing ok with" is highlighted in FIG. 2E because the system learned that the care manager is interested in feelings and progress associated to service procedure whereas "doing ok with" was not highlighted in FIG. 2D because the doctor is only interested in social annotations. Similarly, "BS 3x/day" is not highlighted in FIG. 2E because the care manager is only interested on lab measurements but not temporal information regarding the patient information whereas "BS 3x/day" is highlighted in FIG. 2D because the doctor is interested in temporal information for medications and labs. In FIG. 2E the user is not interested in temporal information for labs (e.g., he is interested in temporal information—duration—for diseases—diabetic for 20 years—and procedures—running 3x/week).

Referring again to FIG. 1, in embodiments, operation 150 infers the correct textual context to visually isolate new annotations personalized to a user profile. Inferring uses reasoning based on semantic and linguistic features of the input text. In embodiments, the phrase "visually isolate" is to mark pieces/fragments of original text to attract attention of a user to something that is relevant to a specific context of the user.

In some embodiments, operation 150 can further be executed to consolidate all top-n personalized highlights to a quick reference list relevant to user profile. In some embodiments, the quick reference list can contain only the information relevant to the user and exclude other text of the input text.

For example, FIG. 2F contains third example output text 200F in accordance with some embodiments of the present disclosure. Third example output text 200F can present consolidated highlights presented to a user via a graphical user interface. In some embodiments, the third example output text 200F is an alternative presentation of the example output text 200D presented in FIG. 2D.

In another example, FIG. 2G illustrates fourth example output text 200G in accordance with some embodiments of the present disclosure. Fourth example output text 200G presents consolidated highlights for the second user (e.g., the user discussed with respect to FIG. 2E). In some embodiments, the fourth example output text 200G is an alternative presentation of second example output text 200E of FIG. 2E.

Referring again to FIG. 1, in various embodiments, the method 100 can learn the importance, to a single user or a set of users (e.g., a set of doctors), of various terms found in text-based case notes. Method 100 may also learn how to personalize the relevant context to emphasize the highlighted terms. Learning is based on user feedback linked to users' profiles and semantic and linguistic features attached to the annotations in the text. It is important to note that, while underlining, bracketing, italicizing, and highlighting text are the implemented highlighting techniques discussed in operation 150 and illustrated in FIGS. 2D-2G, the present disclosure is not limited to such highlighting techniques. There exist additional ways to visually isolate text such as, for example, bold printing and striking through.

In embodiments, feedback regarding the accuracy of the visually isolated text presented in operation 150 is collected from the user profile in operation 160. Outputted information correctly personalized and/or outputted information incorrectly personalized is sent to operation 170 for learning data. In embodiments, for example, feedback could include a confirmation from the care manager that "BS 3x/day" was not highlighted in FIG. 200E because the care manager is only interested on lab measurements and not temporal information regarding the patient information.

In embodiments, the entire input text including any incorrectly visually isolated personalized for a user profile can be re-sent to operation 140 for reapplication using updated user profile information collected in operation 160. Information about the user profile collected in operation 170 can be further analyzed with historical data. Historical data can include contextual data and ground truth text manually annotated by user profiles. In machine-learning, ground truth refers to the accuracy of the training set's classification for supervised learning techniques. Supervised learning can comprise, but is not limited to, analyzing training data and producing an inferred function, which can be used for mapping new examples. Operation 140 can use the data collected in operation 170 to more appropriately visually isolate relevant text in operation 150.

Training data is expanded by associating both the relevancy of a user's profile and visually isolated context annotations and by incorporating user feedback that is given in the form of ground truth text. Ground truth text can comprise natural language processing annotations, semantic knowledge graphs, and parse trees. It is important to note that, in some embodiments, with the performance of each iteration of method 100, the system will learn through feedback. That feedback may be stored in operation 170, retrieved in operation 140, and/or applied in operation 150. For example, the system may learn how to produce highlights (marked fragments of text) consisting of entities (e.g., medication names; aspirin) with the context that is important for a given user (e.g., temporal context for medications; once a day) accurately representing the correct highlight annotations relevant to user profile.

While FIGS. 2A-2G illustrate a single input text (e.g., a single set of texts), embodiments exist that can utilize any amount of input text. The various operations illustrated in FIG. 1 can be implemented using one or more modules, systems, and/or instructions executed on one or multiple host devices and/or remote devices.

It is noted that FIG. 1 is intended to depict the representative major operations of an example method 100 for personalized annotations. In some embodiments, however, individual operations can have greater or lesser complexity than as represented in FIG. 1, operations other than or in addition to those shown in FIG. 1 can be present, and the number, type, and configuration of such operations can vary.

Figure 3:
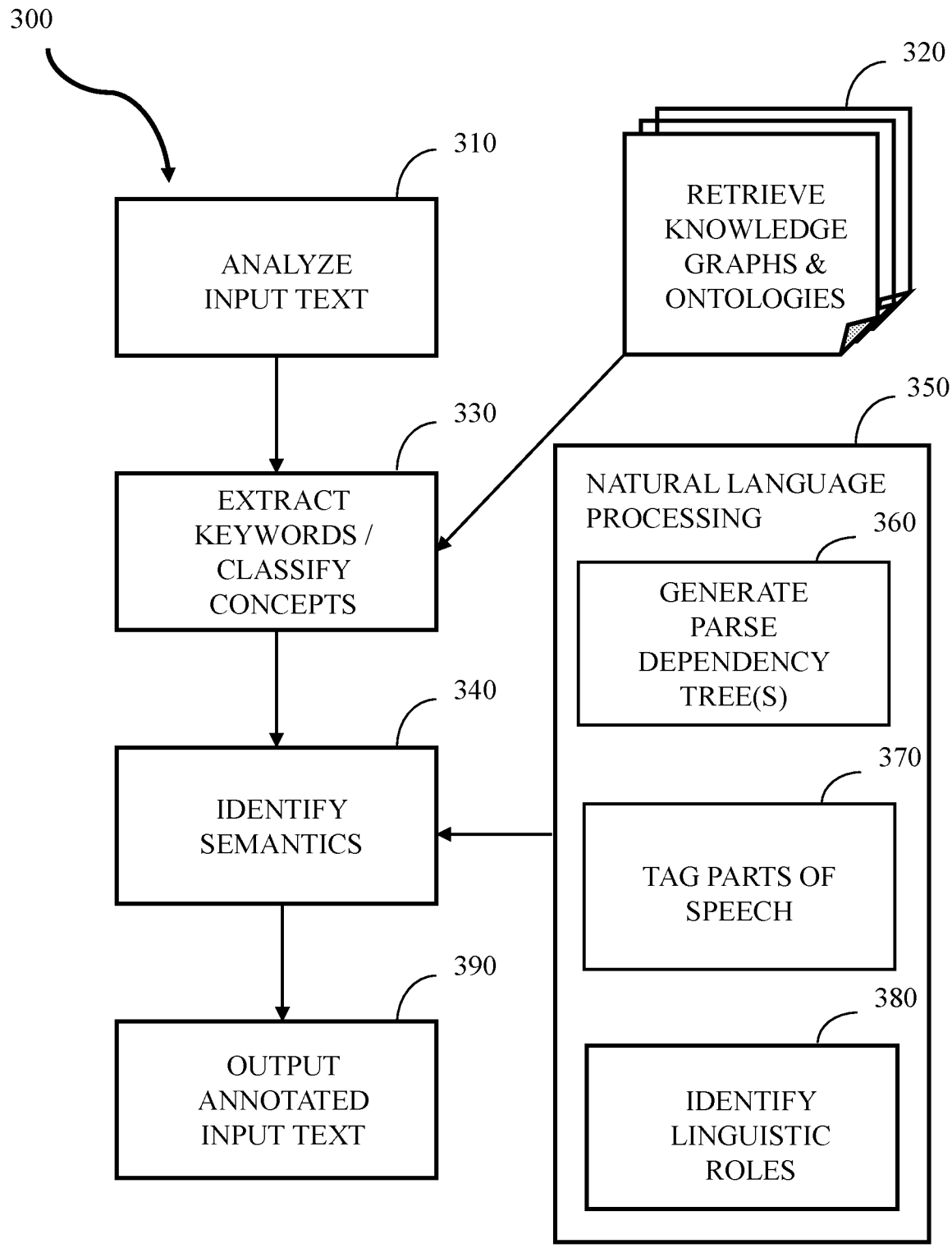
FIG. 3 illustrates a flowchart of an example method for annotation extraction in accordance with some embodiments of the present disclosure.

FIG. 3 illustrates a flowchart of an example method for annotating input text in accordance with some embodiments of the present disclosure. In some embodiments, the method 300 is a sub-method of operation 120 and/or operation 130 in FIG. 1. In various embodiments, the method 300 can be implemented by one or more processors. The method 300 begins by operation 310 analyzing input text (e.g., example input text 200A of FIG. 2A). Sets of input text can include, but are not limited to, a plurality of patient-centric information regarding medical or social care. Patient-centric information can be, for example, patient case notes.

In embodiments, a machine-learning annotation system analyzes input text in operation 310. Operation 310 can analyze input text with an annotator (e.g., such as the annotator used in operation 120 of FIG. 1) to identify keywords. Identifying keywords comprises searching for one or more portions of text (e.g. concept text fragments) containing relevant information associated with the subject of the input text.

In some embodiments, operation 320 retrieves information from a database of hierarchical knowledge domains. Hierarchical knowledge domains can include, but are not limited to, Knowledge Graphs (KGs) and ontologies. In embodiments, operation 320 applies the content of hierarchical knowledge domains to the sentence information derived in operation 310. The coupled data is forwarded to operation 330.

Operation 330 analyzes the annotations for keyword extraction and classifies concepts within the plurality of case notes using the data retrieved in operation 320. In various embodiments, social and medical annotations are extracted in operation 330.

Operation 340 can identify semantic classifications. In embodiments, a computer module (or a set of instructions executable by the natural language processor system) can be configured to identify semantic relationships of recognized text elements (e.g., words, phrases) in received content. In some embodiments, the operation 340 can determine functional dependencies between entities and other semantic relationships.

In embodiments, natural language processing occurs in operation 350 to assign semantic relation types to extracted keyword annotations in input text being semantically classified in operation 340. In some embodiments, operation 350 can be configured to analyze the received content by performing various methods and techniques according to various sets of processor-executable instructions. These sets of processor-executable instructions can include, but are not limited to, generating a parse dependency tree in operation 360, tagging parts-of-speech (POS) in operation 370, and identifying linguistic roles in operation 380.

In embodiments, operation 360 can be a computer module (or a set of instructions executable by a natural language processing system) that can be configured to identify dependency grammar of recognized text elements in received content. A parse tree is a hierarchical structure which represents the derivation of the grammar to yield input strings. Further it uses parsing algorithms to plot syntax trees, distinguishing the dependency relation of dependency grammars. A parse tree is compiled by analyzing the grammar and syntax of patient clinical information. The parse tree is then stored until a command of execution to be processed. Further it is constructed to recognize each sentence, taking each word and determining its structure from its constituent parts. In some embodiments, a parse dependency tree (e.g., as generated in operation 360) can determine functional dependencies between entities.

Consistent with various embodiments, the operation 370 can be a computer module (or a set of instructions executable by the natural language processing system) that marks up a word in passages to correspond to a morphological feature of speech. Operation 370 can read a passage or other text in natural language and assign a part of speech to each word. Operation 370 can determine the part of speech to which a word (or other text element) corresponds based on the definition of the word and the context of the word. The context of a word can be based on its relationship with adjacent and related words in a phrase, sentence, or paragraph. In some embodiments, the context of a word can be dependent on previously analyzed content. Examples of parts of speech that can be assigned to words include, but are not limited to, noun, verb, article, adjective, preposition, pronoun, and tense for sentences containing relevant annotations. In some embodiments, operation 370 can tag or otherwise annotate passages with parts of speech categories. In some embodiments, operation 370 can tag words of a passage to be parsed by a natural language processing system.

Consistent with various embodiments, operation 380 can be a computer module (or a set of instructions executable by a natural language processing system) that marks up a word in passages to correspond to a linguistic role of sentence structure. Operation 380 can read a passage or other text in natural language and assign a role of sentence structure to each word. Operation 380 can determine the role of sentence structure to which a word (or other text element) corresponds based on the definition of the word and the context of the word. The context of a word can be based on its relationship to adjacent and related words in a phrase, sentence, or paragraph. In some embodiments, the context of a word can be dependent on previously analyzed content. Examples of roles of sentence structure that can be assigned to words include, but are not limited to, subjects and objects for sentences containing relevant annotations. In some embodiments, operation 380 can identify or otherwise annotate passages with roles of sentence structure categories. In some embodiments, operation 380 can identify words of a passage to be parsed by a natural language processing system.

In embodiments, information derived through operation 350 is applied to operation 340 to assign semantic types to annotations generated in operation 330.

In operation 390, extracted specific semantic annotated notes are isolated from the input text. For example, in embodiments, the outcome of operation 390 can be illustrated by FIG. 2D and FIG. 2E.

Figure 4:
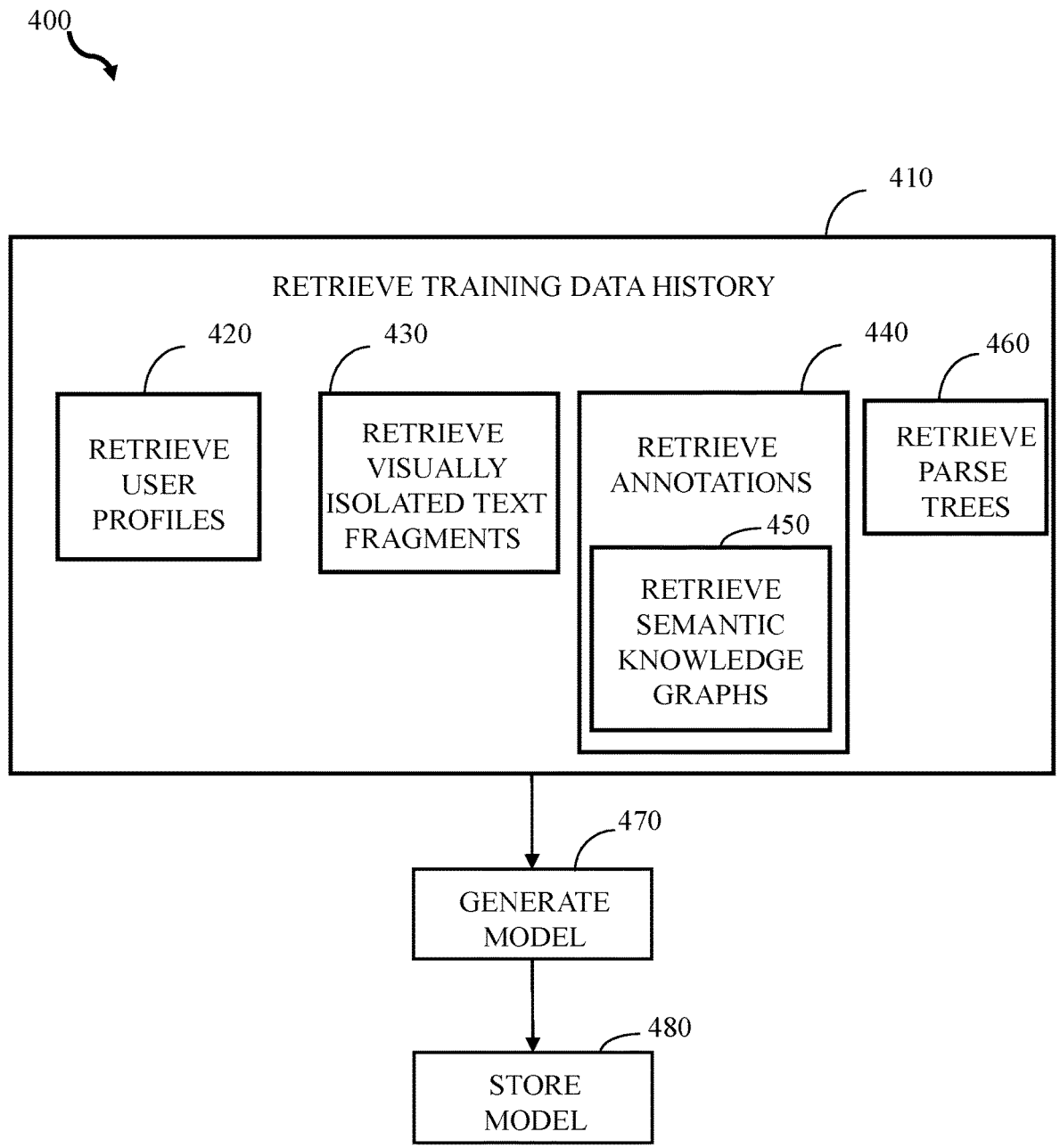
FIG. 4 illustrates a flowchart of an example method for training a model for identifying personalized visually isolated text, according to some embodiments of the present disclosure.

FIG. 4 illustrates a flowchart of an example method for training a model for identifying personalized visually isolated text, according to some embodiments of the present disclosure. In various embodiments, the method 400 can be implemented by one or more processors. In some embodiments, the method 400 can be a sub-method of operation 170 of FIG. 1. In some embodiments, the model generating by the method 400 can be applied in operation 140 of FIG. 1.

The method 400 begins in operation 410 by retrieving training data history. Operation 410 can include retrieving user profiles in operation 420, retrieving visually isolated text fragments in operation 430, retrieving annotations in operation 440, and retrieving parse trees in operation 460.

Operation 420 can retrieve user profiles from, for example, a database of user profiles. User profiles can be associated with a role (e.g., doctor, nurse, etc.), a location, a set of preferences (e.g., a set of preferred concepts, a set of preferred categories, etc.), and other information.

Operation 430 can retrieve visually isolated text fragments. The visually isolated text fragments can be manually visually isolated (e.g., as ground-truth samples) and/or retrieved during previous iterations of the method 100 of FIG. 1 for various user profiles such as the user profiles collected in operation 420.

Operation 440 can retrieve annotations. The annotations can be retrieved from previous iterations of the method 100 of FIG. 1. In some embodiments, operation 440 further comprises retrieving semantic knowledge graphs in operation 450. The semantic knowledge graphs retrieved in operation 450 can provide context for annotations retrieved in operation 440.

Operation 460 can retrieve parse trees. The parse trees can be retrieved from previous iterations of the method 100 of FIG. 1 and/or from any ground-truth samples manually visually isolated and used as initial training data.

Operation 470 can generate a model based on the training data history collected in operation 410. The generated model can associate various characteristics of user profiles to various patterns of visually isolating input text. A pattern of visually isolated input text can be based on respective classifiers (e.g., respective concepts and respective categories) associated with a user profile. For example, a pattern of visually isolated input text can visually isolate respective text fragments of the input text corresponding to respective concepts and/or respective categories associated with the user profile. For example, the generated model can be configured to highlight, for a user having a doctor role, nouns of input text associated with a "disease" classifier (where a classifier can refer to a concept, a category, or a different classification extractable by NLP), words (e.g., nouns) of input text associated with a "medication" classifier, words (e.g., modifiers) associated with a "measurement" classifier, and words (e.g., modifiers) associated with a "temporal" classifier. In some embodiments, the model generated in operation 470 can also be configured to exclude portions of input text. For example, the model can be configured to exclude words (e.g., nouns) associated with a "patient name" classifier according to a particular user profile.

In various embodiments, operation 470 can utilize machine learning algorithms to generate the model. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric learning, rule-based machine learning, and/or other algorithms configured to generate a model based on the training data history retrieved in operation 410.

Operation 480 can store the model generation in operation 470. In some embodiments, the model is stored in a computer readable storage medium. In some embodiments, the model is applied in, for example, operation 150 of FIG. 1.

Although the method 400 discusses generating a model, the method 400 can also be used to update an existing model.

For example, operation 410 can retrieve additional training data (e.g., collected from user feedback) to generate an updated model (e.g., a new iteration of a previous model) in operation 470. The updated model can be stored in operation 480.

Figure 5:
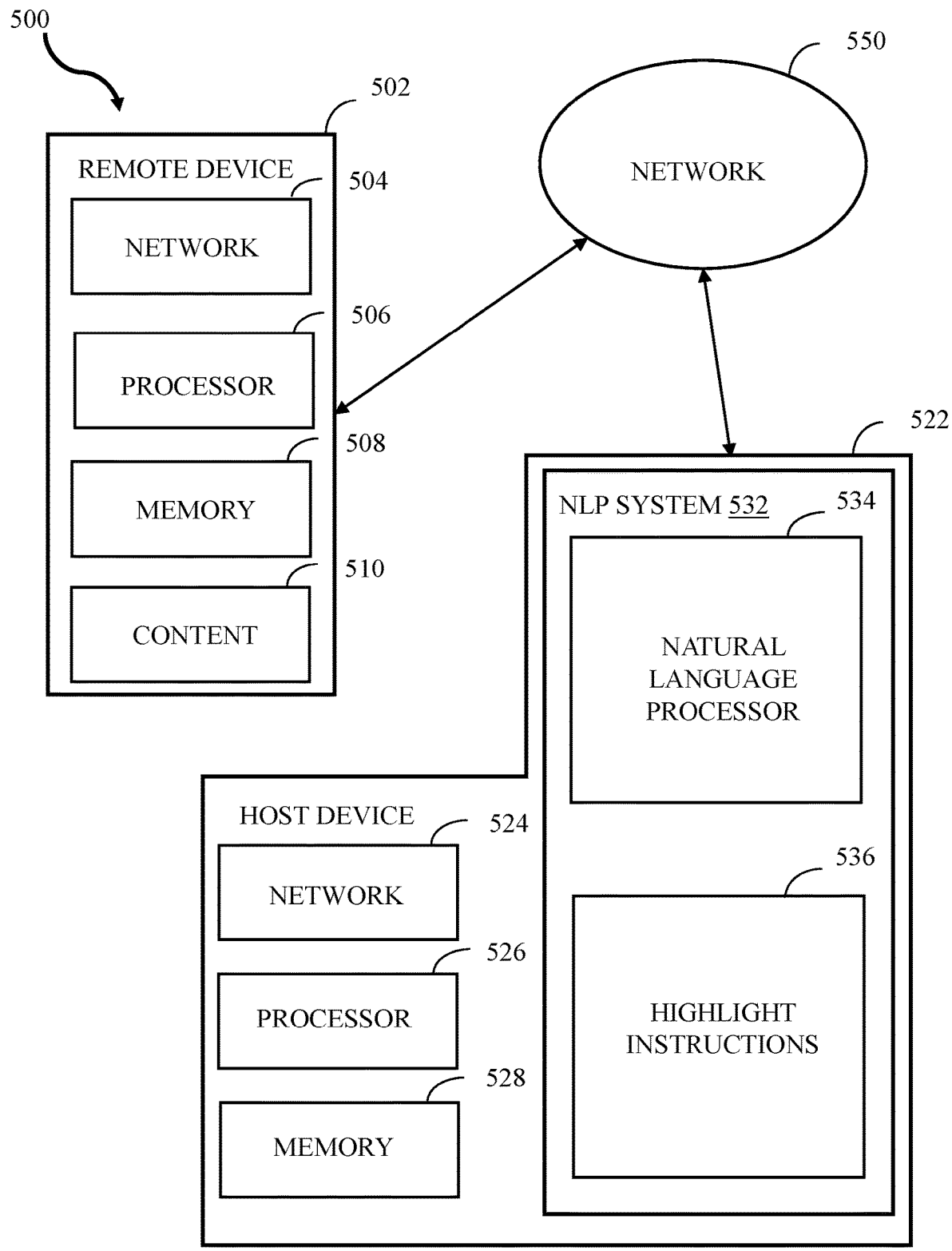
FIG. 5 depicts a block diagram of an example computing environment in which embodiments of the present disclosure may be implemented.

FIG. 5 depicts a block diagram of an example computing environment 500 in which embodiments of the present disclosure can be implemented. In some embodiments, aspects of computing environment 500 can perform any of the methods described in FIGS. 1, 3, and/or 4. In some embodiments, aspects of the computing environment 500 can receive, modify, analyze, and/or present any of the text illustrated in FIGS. 2A-2G. In embodiments, the computing environment 500 can include a remote device 502 and a host device 522.

According to embodiments, the host device 522 and the remote device 502 can be computer systems. The remote device 502 and the host device 522 can include one or more processors 506 and 526 and one or more memories 508 and 528, respectively. The remote device 502 and the host device 522 can be configured to communicate with each other through an internal or external network interface 504 and 524 (e.g., modems or interface cards). The remote device 502 and/or the host device 522 can be equipped with a display or monitor. Additionally, the remote device 502 and/or the host device 522 can include optional input devices (e.g., a keyboard, mouse, scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote device 502 and/or the host device 522 can be servers, desktops, laptops, or hand-held devices.

The remote device 502 and the host device 522 can be distant from each other and can communicate over a network 550. In embodiments, the host device 522 can be a central hub from which a remote device 502 and other remote devices (not pictured) can establish a communication connection, such as in a client-server networking model. In some embodiments, the host device 522 and remote device 502 can be configured in any other suitable network relationship (e.g., in a peer-to-peer configuration or using another network topology).

In embodiments, the network 550 can be implemented using any number of any suitable communications media. For example, the network 550 can be a wide area network (WAN), a local area network (LAN), the Internet, or an intranet. In certain embodiments, the remote device 502 and the host device 522 can be local to each other, and communicate via any appropriate local communication medium. For example, the remote device 502 and the host device 522 can communicate using a local area network (LAN), one or more hardwire connections, a wireless link or router, or an intranet. In some embodiments, the remote device 502, the host device 522, and any other devices can be communicatively coupled using a combination of one or more networks and/or one or more local connections. For example, the remote device 502 can be hardwired to the host device 522 (e.g., connected with an Ethernet cable) while a second device (not pictured) can communicate with the host device using the network 550 (e.g., over the Internet).

In some embodiments, the network 550 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 550.

In some embodiments, the remote device 502 can enable users to review, create, and/or provide input text (e.g., medical information) to the host device 522. In some embodiments, the host device 522 can include a natural language processing system 532. The natural language processing system 532 can include a natural language processor 534 and highlight instructions 536. The natural language processor 534 can include numerous subcomponents, such as a tokenizer, a part-of-speech (POS) tagger, a semantic relationship identifier, and a syntactic relationship identifier. The natural language processor 534 can be configured to perform natural language processing to ingest content 510 from remote device 502. Content can be, for example, input text and/or user profile(s). In various embodiments, content 510 can further comprise input text such as medical information, a set of data (e.g., a user profile), or a corpus of data (e.g., a database of patient profiles, a set of training data, etc.).

The highlight instructions 536 can be configured to analyze morphological features of an input set of texts to visually isolate aspects of the input text. The highlight instructions 536 can be executed by one or more processors (e.g., natural language processor 534).

While FIG. 5 illustrates a computing environment 500 with a single host device 522 and a single remote device 502, suitable computing environments for implementing embodiments of this disclosure can include any number of remote devices and host devices. The various models, modules, systems, instructions, and components illustrated in FIG. 5 can exist, if at all, across a plurality of host devices and remote devices.

It is noted that FIG. 5 is intended to depict the representative major components of an example computing environment 500. In some embodiments, however, individual components can have greater or lesser complexity than as represented in FIG. 5, components other than or in addition to those shown in FIG. 5 can be present, and the number, type, and configuration of such components can vary.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to automatically generate visually isolated text annotations from a text document, personalized to a user profile, comprising:
   receiving an input text;
   annotating the input text by:
      annotating respective text fragments of the input text for respective concepts of a set of concepts; and
      categorizing respective annotated text fragments of the input text for respective categories of a set of categories;
   retrieving profile characteristics of the user profile;
   visually isolating respective text fragments of the input text based on the characteristics of the user profile;
   outputting the visually isolated text to a user device associated with the user profile;
   collecting a set of training data; and
   generating a model to associate a respective user profile to a respective pattern of visually isolated text fragments, wherein the respective pattern is based on respective concepts and respective categories associated with respective text fragments of the input text;
   wherein the set of training data comprises user profile data, visually isolated text fragments from historical data, annotations from historical data, and parse trees from historical data; and
   wherein the annotations from historical data further comprise semantic knowledge graphs associated with the annotations from historical data.

2. The method of claim 1, wherein annotating the input text further comprises:
   linking respective annotated concepts of respective text fragments of the input text to hierarchical knowledge domains;
   filtering the linked text fragments through a natural language processing (NLP) parse dependency tree and assigning a respective semantic identifier to respective linked text fragments; and
   linking a respective semantic identifier to respective linked text fragments.

3. The method of claim 2, wherein hierarchical knowledge domains comprise Knowledge Graphs and ontologies.

4. The method of claim 2, wherein the natural language processing (NLP) parse dependency tree identifies respective roles of respective text fragments of the input text.

5. The method of claim 1, wherein the input text comprises patient information, wherein the set of concepts comprises: activity, disease, labs, medication, person, procedure, and service concepts; and wherein the set of categories comprises: clinical, contact, and social categories.

6. A system to automatically generate visually isolated text fragments from a text document, personalized to a user profile, comprising:
a computer readable storage medium storing a corpus of data;
a user interface configured to receive input and present output; and
a processor communicatively coupled to the computer readable storage medium and the user interface and having a memory comprising instructions, which, when executed by the processor, cause the processor to:
receive an input text;
annotate the input text by:
annotating respective text fragments of the input text for respective concepts of a set of concepts; and
categorizing respective annotated text fragments of the input text for respective categories of a set of categories;
retrieve profile characteristics of the user profile;
visually isolate respective text fragments of the input text based on the characteristics of the user profile;
output the visually isolated text associated with the user profile to the user interface;
collect a set of training data;
generate a model to associate a respective user profile to a respective pattern of visually isolated text fragments, wherein the respective pattern is based on respective concepts and respective categories associated with respective text fragments of the input text; and
update the model based on user feedback;
wherein the set of training data comprises user profile data, visually isolated text fragments from historical data, annotations from historical data, and parse trees from historical data; and
wherein the annotations from historical data further comprise semantic knowledge graphs associated with the annotations from historical data.

7. The system of claim 6, wherein the processor is further configured to annotate the input text by:
linking respective annotated concepts of respective text fragments of the input text to hierarchical knowledge domains;
filtering the inked text fragments through a natural language processing (NLP) parse dependency tree and assigning a respective semantic identifier to respective linked text fragments; and
linking a respective semantic identifier to respective linked text fragments.

8. The system of claim 7, wherein hierarchical knowledge domains comprise Knowledge Graphs and ontologies; and
wherein natural language processing (NLP) parse dependency trees identify respective roles of respective text fragments of the input text.

9. The system of claim 6, wherein the input text comprises patient information, wherein the set of concepts comprises: activity, disease, labs, medication, person, procedure, and service concepts; and wherein the set of categories comprises: clinical, contact, and social categories.

10. A computer program product for automatically generating visually isolated text annotations from a text document, personalized to a user profile, the computer program product comprising a computer readable storage medium having program instructions embodied therewith, the program instructions executable by a processor to cause the processor to:
receive an input text;
annotating the input text by:
annotating respective text fragments of the input text for respective concepts of a set of concepts; and
categorizing respective annotated text fragments of the input text for respective categories of a set of categories;
retrieving profile characteristics of the user profile;
visually isolating respective text fragments of the input text based on the characteristics of the user profile;
outputting the visually isolated text to a user device associated with the user profile;
collect a set of training data; and
generate a model to associate a respective user profile to a respective pattern of visually isolated text fragments, wherein the respective pattern is based on respective concepts and respective categories associated with respective text fragments of the input text;
wherein the set of training data comprises user profile data, visually isolated text fragments from historical data, annotations from historical data, and parse trees from historical data; and
wherein the annotations from historical data further comprise semantic knowledge graphs associated with the annotations from historical data.

11. The computer program product of claim 10, wherein the program instructions configured to annotate the input text are further configured to cause the processor to:
link respective annotated concepts of respective text fragments of the input text to hierarchical knowledge domains;
filter the linked text fragments through natural language processing (NLP) parse dependency tree and assigning a respective semantic identifier to respective linked text fragments; and
link a respective semantic identifier to respective linked text fragments.

12. The computer program product of claim 11, wherein hierarchical knowledge domains comprise Knowledge Graphs and ontologies; and
wherein natural language processing (NLP) parse dependency trees identify respective roles of respective text fragments of the input text.

13. The computer program product of claim 10, wherein the input text comprises patient information, wherein the set of concepts comprises: activity, disease, labs, medication, person, procedure, and service concepts; and
wherein the set of categories comprises: clinical, contact, and social categories.

* * * * *